United States Patent
Kanamori

(10) Patent No.: US 10,569,726 B2
(45) Date of Patent: Feb. 25, 2020

(54) IN-VEHICLE SYSTEM

(71) Applicant: DENSO CORPORATION, Kariya, Aichi-pref. (JP)

(72) Inventor: Motoki Kanamori, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 161 days.

(21) Appl. No.: 15/557,902

(22) PCT Filed: Mar. 11, 2016

(86) PCT No.: PCT/JP2016/001377
§ 371 (c)(1),
(2) Date: Sep. 13, 2017

(87) PCT Pub. No.: WO2016/152064
PCT Pub. Date: Sep. 29, 2016

(65) Prior Publication Data
US 2018/0056898 A1   Mar. 1, 2018

(30) Foreign Application Priority Data

Mar. 25, 2015   (JP) .................................. 2015-062519

(51) Int. Cl.
*B60R 16/023*  (2006.01)
*H04M 1/66*  (2006.01)
(Continued)

(52) U.S. Cl.
CPC ............ *B60R 16/0231* (2013.01); *B60R 1/00* (2013.01); *G06F 13/102* (2013.01); *G09G 3/2096* (2013.01); *H04N 7/183* (2013.01); *B60R 2300/404* (2013.01); *B60R 2300/406* (2013.01); *B60R 2300/50* (2013.01); *B60R 2300/8066* (2013.01); *G09G 2330/026* (2013.01); *G09G 2360/08* (2013.01); *G09G 2370/12* (2013.01);
(Continued)

(58) Field of Classification Search
CPC ......... B60R 16/023; G07C 5/08; G06F 9/445; G06F 9/00; H04M 1/66
See application file for complete search history.

(56) References Cited

U.S. PATENT DOCUMENTS 6,178,515 B1 * 1/2001 Hayashi .................... G06F 1/30
                                                                713/1
8,781,442 B1 * 7/2014 Link, II .................. G08G 1/205
                                                              455/411
(Continued)

FOREIGN PATENT DOCUMENTS

JP   2003114804 A   4/2003
JP   2009078752 A   4/2009
(Continued)

*Primary Examiner* — Yuri Kan
(74) *Attorney, Agent, or Firm* — Harness, Dickey & Pierce, P.L.C.

(57) ABSTRACT

An in-vehicle system includes a primary CPU that is mounted in a vehicle and operates on a general-purpose OS, and a peripheral device that is controlled by the primary CPU. The in-vehicle system further includes a secondary CPU that operates on a real-time OS. The secondary CPU performs an initialization process on the peripheral device at startup, and then assigns control of the peripheral device to the primary CPU.

3 Claims, 6 Drawing Sheets

(51) Int. Cl.
*G06F 9/00* (2006.01)
*G07C 5/08* (2006.01)
*G06F 9/445* (2018.01)
*B60R 1/00* (2006.01)
*G06F 13/10* (2006.01)
*G09G 3/20* (2006.01)
*H04N 7/18* (2006.01)

(52) U.S. Cl.
CPC ..... *G09G 2370/14* (2013.01); *G09G 2380/10* (2013.01)

(56) References Cited

U.S. PATENT DOCUMENTS

2008/0077786 A1\* 3/2008 Pierce ................... G06F 9/4405 713/2
2011/0175772 A1 7/2011 Sambongi
2014/0068155 A1 3/2014 Nitta et al.
2015/0254911 A1\* 9/2015 Kimura ................... G06F 1/18 701/50
2016/0011576 A1 1/2016 Takeda et al.

FOREIGN PATENT DOCUMENTS

| JP | 2009128313 A | 6/2009 |
| JP | 2009258986 A | 11/2009 |
| JP | 2010079566 A | 4/2010 |
| JP | 2011164089 A | 8/2011 |
| JP | 2011215796 A | 10/2011 |
| JP | 2012074863 A | 4/2012 |
| JP | 2013097728 A | 5/2013 |
| JP | 2013152509 A | 8/2013 |
| JP | 2014048817 A | 3/2014 |
| JP | 2014197370 A | 10/2014 |

\* cited by examiner

IN-VEHICLE SYSTEM

CROSS REFERENCE TO RELATED APPLICATIONS

This application is a U.S. National Phase Application under 35 U.S.C. 371 of International Application No. PCT/JP2016/001377 filed on Mar. 11, 2016 and published in Japanese as WO 2016/152064 A1 on Sep. 29, 2016. This application is based on and claims the benefit of priority from Japanese Patent Application No. 2015-062519 filed on Mar. 25, 2015. The entire disclosures of all of the above applications are incorporated herein by reference.

TECHNICAL FIELD

The present disclosure relates to an in-vehicle system having a vehicle-mounted primary CPU operating on a general-purpose OS and a plurality of peripheral devices controlled by the primary CPU.

BACKGROUND ART

An in-vehicle system called an IVI (In-Vehicle Infotainment) system is widely used in recent years. This type of in-vehicle system lets a primary CPU integrally manage a plurality of in-vehicle apparatuses such as a navigation apparatus, an audio apparatus, and a reverse guide camera apparatus. The primary CPU operates on a standard OS (general-purpose OS) such as a Linux (registered trademark) OS, and controls peripheral devices such as a media device (eMMC) for storing primary CPU applications and a video decoder for acquiring reverse guide camera images.

When the in-vehicle system is used, it takes a relatively long time for the primary CPU to start Linux. Therefore, a user (a vehicle driver) has to wait for a long time before a desired instrument completes its startup process upon activation of a vehicle accessory switch. When an accessory switch is turned on, a long period of time is particularly required for the initialization of a media device for storing CPU applications and for the initialization of various peripheral devices such as a video IF (video decoder). This causes the user to wait for a long time and prevents the user from immediately using, for example, a function of a reverse guide camera.

A technology disclosed in Patent literature 1 ensures a rapid restart of a car navigation apparatus by supplying backup power to a DRAM upon engine shutdown in order to memorize an operating state prevailing before engine shutdown.

PRIOR ART LITERATURES

Patent Literature

Patent literature 1: JP 2009-128313 A

SUMMARY OF INVENTION

During a startup process of the primary CPU in the in-vehicle system, various processes, namely, program booting, initialization of a media device (eMMC), application program loading, initializations of various devices, and execution of an application, are sequentially performed, after the elapse of power supply stabilization time subsequent to power on. More specifically, for example, the initialization of the media device requires approximately 1000 ms, and the initialization of the video IF (video decoder) requires approximately 400 ms. Thus, for example, a total of approximately 3.4 s is required for the display of a reverse guide camera image. From the viewpoint of enhanced safety, it is demanded that the time required for the display of a camera image be reduced to 2 seconds or less.

It is an object of the present disclosure to provide an in-vehicle system that can reduce the time required for the completion of a startup process.

To achieve the above object, according to an example of the present disclosure, an in-vehicle system is provided to include a primary CPU that is mounted in a vehicle and operates on a general-purpose OS, and a peripheral device (the number of which is at least one) that is controlled by the primary CPU. The in-vehicle system further includes a secondary CPU that operates on a real-time OS. The secondary CPU performs an initialization process on the peripheral device at startup, and then assigns control of the peripheral device to the primary CPU.

At in-vehicle system startup, the secondary CPU operating on the real-time OS in the above configuration performs the initialization process on the peripheral devices. The initialization process on the peripheral devices can be performed in parallel with a startup process performed by the primary CPU, namely, a process for power supply stabilization and program booting. This reduces the time required for the startup process. The in-vehicle system incorporates a control assignment (control switching) procedure or a control assignment (control switching) element. After completion of the initialization process on the peripheral devices, control of the peripheral devices is assigned from the secondary CPU to the primary CPU operating on the general-purpose OS. Subsequently, regular control can be exercised.

As described, the CPU for controlling the peripheral devices at peripheral device startup is different from the CPU for controlling the peripheral devices during a regular operation. Therefore, optimal control can be exercised. This expedites the startup process. The in-vehicle system provides an excellent advantageous effect of reducing the time required for the completion of the startup process.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
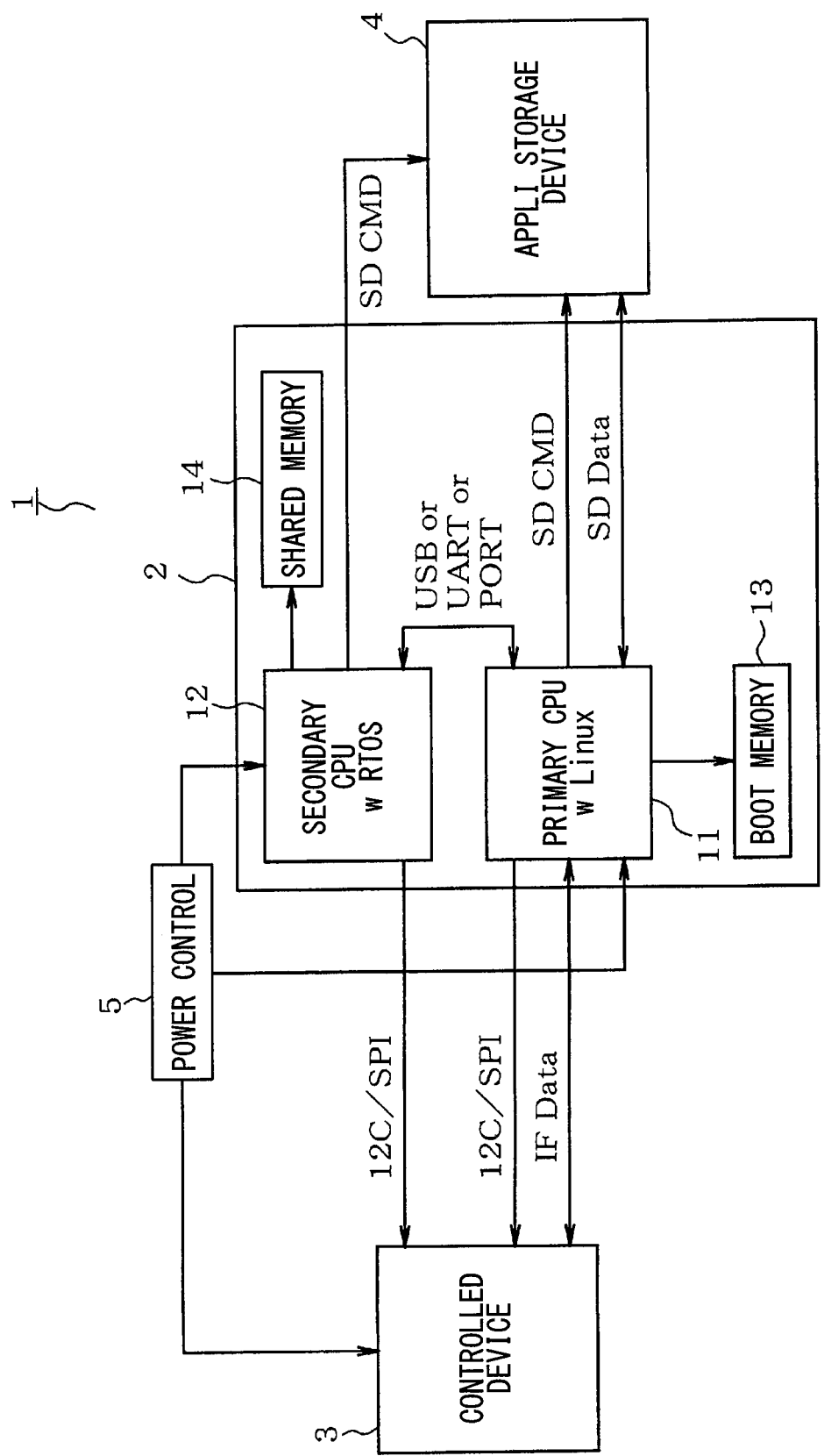
FIG. 1 is a schematic diagram illustrating an electrical configuration of an in-vehicle system according to an embodiment of the present disclosure.

An embodiment of the present disclosure will now be described with reference to the accompanying drawings. FIG. 1 is a schematic diagram illustrating an electrical configuration of an in-vehicle system 1 mounted in a vehicle (automobile) in accordance with the present embodiment. The in-vehicle system 1 includes a control apparatus 2, a plurality of peripheral devices 3, 4, and a power supply controller 5. The control apparatus 2 may be referred to as an electronic control apparatus 2 or a controller 2. The peripheral devices 3, 4 are controlled by a CPU included in the control apparatus 2. In the embodiment, the peripheral devices include a video IF 3 and a media device 4. The video IF 3 includes a video decoder for displaying an image on a display apparatus 6 (see FIGS. 5A and 5B). The media device 4 includes an SD or eMMC for storing applications.

Although not shown, the control apparatus 2 is connected to and controls, for example, a manipulating unit, a loudspeaker, a microphone, and an FPGA. Although not shown, the control apparatus 2 is further connected to and integrally manages various in-vehicle instruments, such as a navigation apparatus (navigation ECU), a GPS apparatus, an audio apparatus (audio ECU), and a reverse guide camera apparatus (camera ECU). Additionally, the control apparatus 2 (in-vehicle system 1) may be wirelessly connected to an external electronic instrument such as a mobile phone or a smartphone.

Figure 5A:
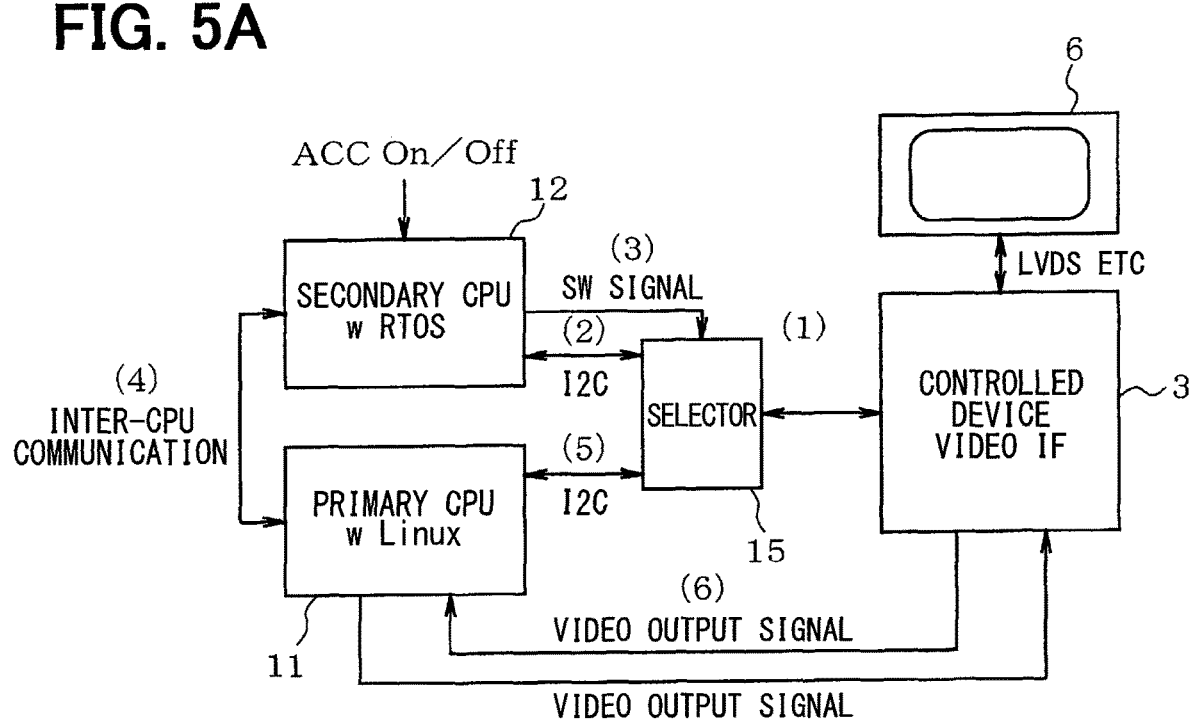
FIG. 5A is a diagram illustrating operating steps performed at startup and an essential configuration for CPU control switching with respect to a video IF.
Figure 5B:
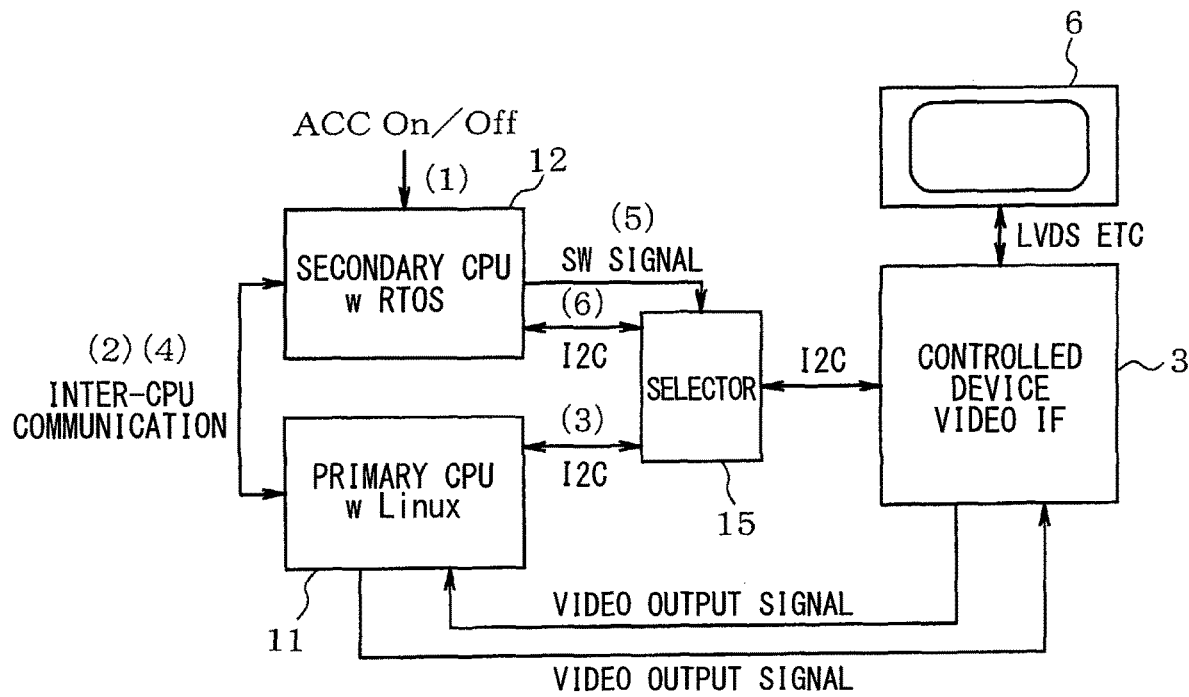
FIG. 5B is a diagram illustrating operating steps performed at shutdown and an essential configuration for CPU control switching with respect to the video IF.

As in FIGS. 5A and 5B, the control apparatus 2 exercises control through the video IF 3 to let the display apparatus 6 display, for example, a reverse guide camera image, a map generated by a navigation apparatus, a TV, movie, or other video image, and various information screens including an initial screen. The connection between the video IF 3 and the display apparatus 6 is made in compliance, for example, with the LVDS standard.

As in FIG. 1, when a vehicle's start switch (accessory switch) is turned on for startup purposes, the power supply controller 5 supplies drive power to the control apparatus 2 and to the peripheral devices. However, even when the start switch is turned off, electrical power for primarytaining a standby state is continuously supplied to a later-described secondary CPU. The in-vehicle system 1 may let the control apparatus 2 exercise navigation and audio functions or may have neither the navigation function nor the audio function.

The control apparatus 2 includes a primary CPU 11 and a secondary CPU 12. The primary CPU 11 operates on a general-purpose OS such as Linux (registered trademark). Meanwhile, the secondary CPU 12 operates on a real-time OS (RTOS). The primary CPU 11 and the secondary CPU 12 are communicatively connected in compliance with the USB, UART, PORT, or other standard. Further, the primary CPU 11 is connected to a boot memory 13 that stores a BSP program for starting (activating) a computer. The control apparatus 2 further includes a shared memory 14 that is accessible from both the primary CPU 11 and the secondary CPU 12.

The primary CPU 11 and the secondary CPU 12 are both capable of controlling the video IF 3 and the media device 4. Further, as described in detail later with reference to operations, at system startup, that is, when the start switch (accessory switch) is turned on, the secondary CPU 12 performs an initialization process on the video IF 3 and the media device 4, and then assigns control of (switches the access right for) the video IF 3 and the media device 4 from the secondary CPU 12 to the primary CPU 11.

As in FIGS. 5A and 5B, the video IF 3 is provided with a first selector 15 for switching the access right between the primary CPU 11 and the secondary CPU 11. The first selector 15 is subjected to switching control that is exercised by a switching signal from the secondary CPU 12. I2C communication is established between the CPUs 11, 12 and the video IF 3. Further, as in FIGS. 6A and 6B, the media device 4 is provided with a second selector 16 for switching the access right between the primary CPU 11 and the secondary CPU 11. The second selector 16 is also subjected to switching control that is exercised by a switching signal from the secondary CPU 12. CMD (SPI) communication is established between the CPUs 11, 12 and the media device 4.

Moreover, at system shutdown, that is, when the start switch (accessory switch) is turned off, the primary CPU 11 assigns control of the video IF 3 and the media device 4 to the secondary CPU 12 and performs its own shutdown process. The secondary CPU 12 performs a shutdown process on the video IF 3 and the media device 4, turns off the primary CPU 11, and goes into a standby (sleep) state.

Figure 2:
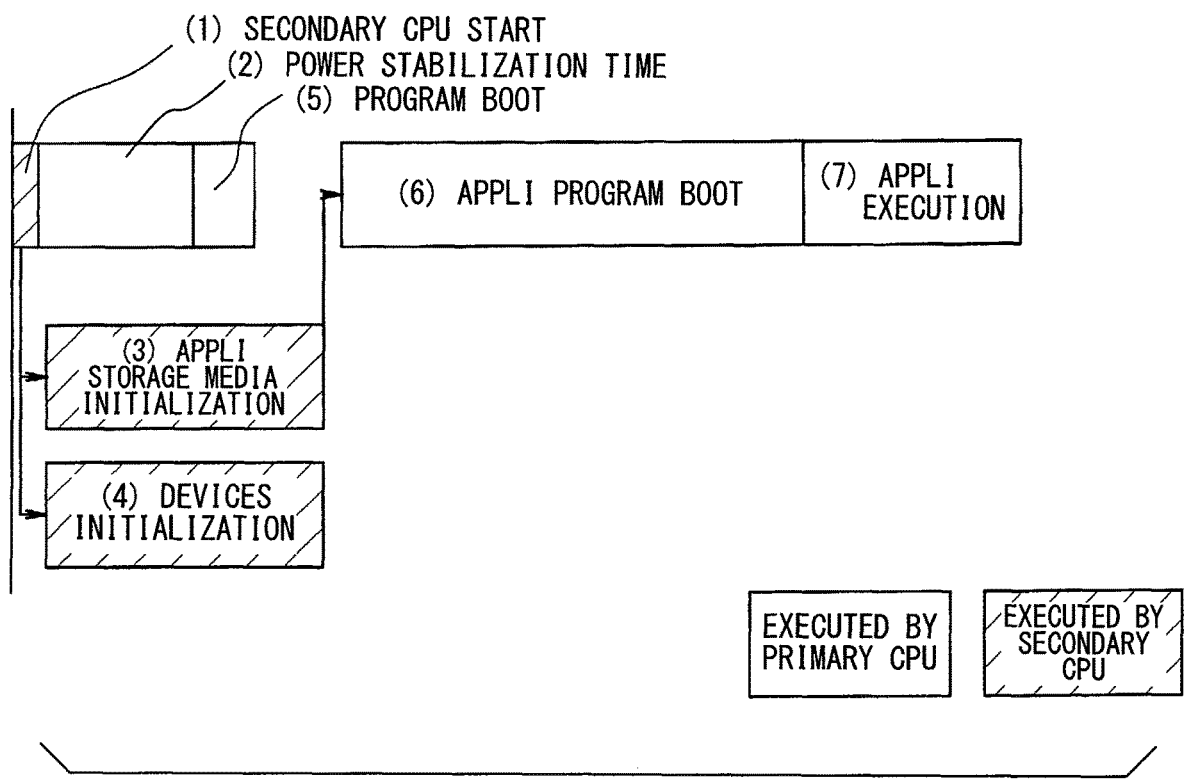
FIG. 2 is a timing diagram illustrating processes that are performed by different CPUs at system startup.

Operations performed by the above-described configuration will now be described with additional reference to FIGS. 2 to 6. The timing diagram of FIG. 2 illustrates processes that are sequentially performed by the primary CPU 11 and the secondary CPU 12 when the in-vehicle system 1 starts up (the accessory switch is turned on). The flowchart of FIG. 3 illustrates processing steps that are performed by the secondary CPU 12 and the primary CPU 11 at startup (when the accessory switch is turned on).

It is noted that a flowchart to be described includes sections (also referred to as steps), each of which is represented, for instance, as S1 or M1. Further, each section can be divided into several sub-sections while several sections can be combined into a single section. Furthermore, each of thus configured sections can be also referred to as a device, a module, or a unique name such as an assignment section, an assignment device, an assignment module, or an assigner. Each or any combination of sections explained in the above can be achieved as (i) a software section in combination with a hardware unit (e.g., computer or CPU) or (ii) a hardware section (e.g., integrated circuit, hard-wired logic circuit), including or not including a function of a related apparatus; furthermore, the hardware section may be constructed inside of a microcomputer.

Figure 3:
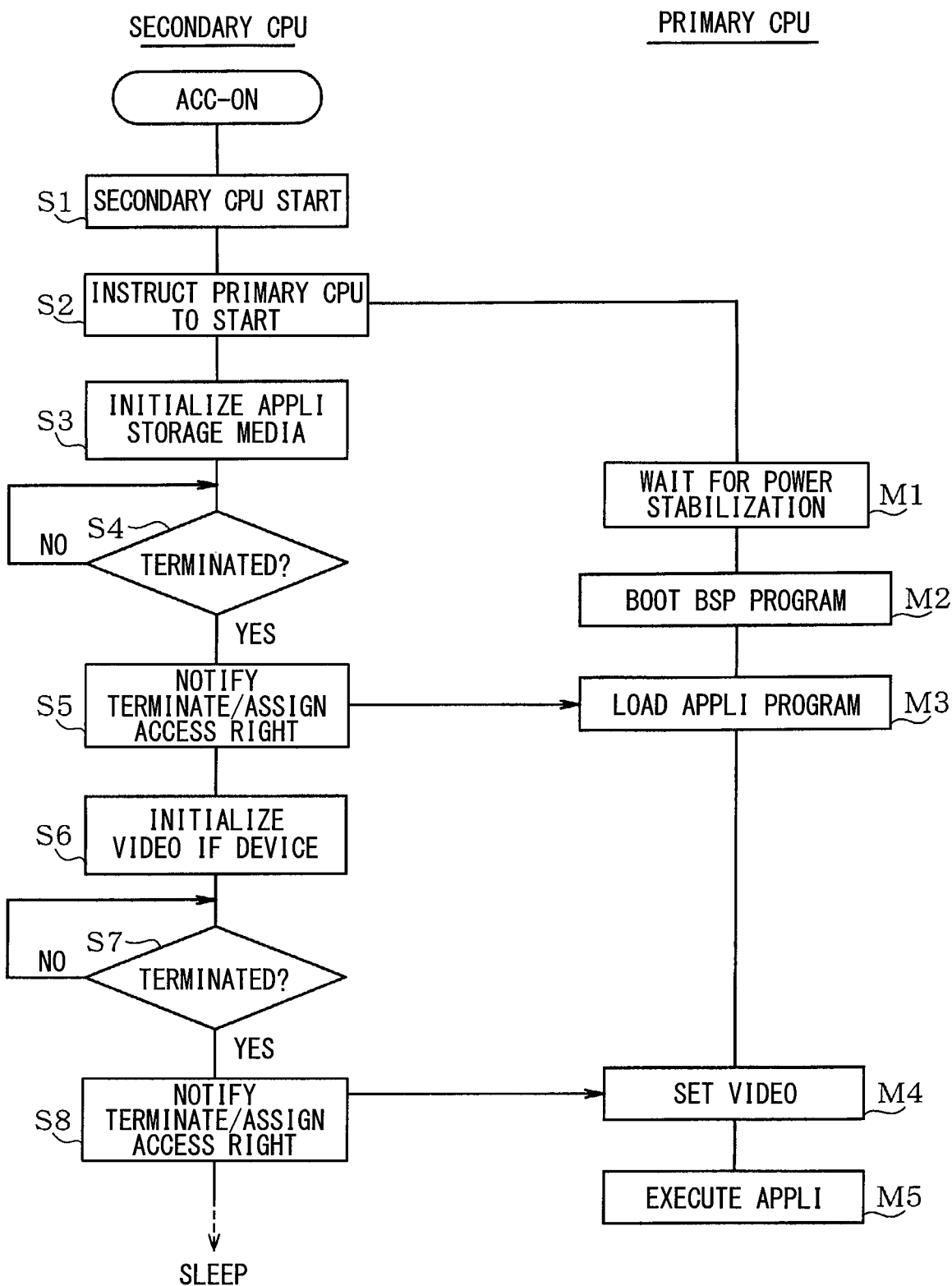
FIG. 3 is a flowchart illustrating processing steps that are performed by a control apparatus at system startup.

As in FIG. 3, when the accessory switch is turned on, the secondary CPU 12 performs its startup process at S1. The secondary CPU 12 can start up in an extremely short period of time (process (1) in FIG. 2) because the secondary CPU 12 was placed in the standby state (sleep state) when the system shut down (when the accessory switch was turned off). When the secondary CPU 12 starts up, a startup process for the primary CPU 11 is performed at S2 in compliance with an instruction from the secondary CPU 12.

Although the power supply controller 5 starts supplying power to the primary CPU 11, a predetermined period of time at M1 (e.g., 280 ms) is required for power supply stabilization (process (2) in FIG. 2). After the elapse of the power supply stabilization time for the primary CPU 11, a program is booted (the primary CPU 11 is started up) at M2 (process (5) in FIG. 2).

Meanwhile, the secondary CPU 12 performs an initialization process on the media device 4 for application storage at S3. As in FIG. 2, the initialization process on the media device 4 (process (3) in FIG. 2) is performed in parallel with power supply stabilization (process (2) in FIG. 2) and program booting (process (5) in FIG. 2) for the primary CPU 11, and requires a predetermined period of time (e.g., 500 ms). As in FIG. 3, it is determined at S4 whether the initialization process on the media device 4 is terminated. If it is terminated (Yes at S4), the primary CPU 11 is notified at S5 that the initialization process on the media device 4 is terminated, and a process for assigning the access right for the media device 4 is performed. This access right assignment process will be described later with reference to FIGS. 6A and 6B.

At S6, the secondary CPU 12 performs an initialization process on various devices other than the media device 4, that is, an initialization process on the video IF 3 in the current example (process (4) in FIG. 2). As in FIG. 2, the initialization process on the video IF 3 can be performed in parallel with the initialization process on the media device 4 (process (3) in FIG. 2), and requires a predetermined period of time (e.g., 500 ms). As in FIG. 3, it is determined at S7 whether the initialization process on the video IF 3 is terminated. If it is terminated (Yes at S7), the primary CPU 11 is notified at S8 that the initialization process on the video IF 3 is terminated, and a process for assigning the access right for the video IF 3 is performed. This access right assignment process will be described later with reference to FIGS. 5A and 5B.

Meanwhile, when the access right for the media device 4 is assigned from the secondary CPU 12 as described (S5) after completion of the program booting process at M2, the primary CPU 11 loads an application program from the media device 4 at M3. The process for loading the application program takes, for example, 1000 ms (process (6) in FIG. 2). Referring to FIG. 3, when the access right for the video IF 3 is assigned from the secondary CPU 12 (S8), the primary CPU 11 performs a video setup process at M4, and then executes the application program at M5 (process (7) in FIG. 2).

The primary CPU 11 to which the access right is assigned begins to exercise, for example, regular control over a plurality of devices. The secondary CPU 12, which assigned the access right to the primary CPU 11 (S8), goes into the sleep (standby) state. As is obvious from FIG. 2, the initialization process on the peripheral devices, namely, the media device 4 and the video IF 3, is performed at startup by the secondary CPU 12 operating on the real-time OS. Therefore, the initialization process on the media device 4 and the video IF 3 can be performed in parallel with the startup process in the primary CPU 11, that is, the process for power supply stabilization (2) and program booting (5). The time required for the startup process on the whole in-vehicle system 1 can be reduced.

Figure 4:
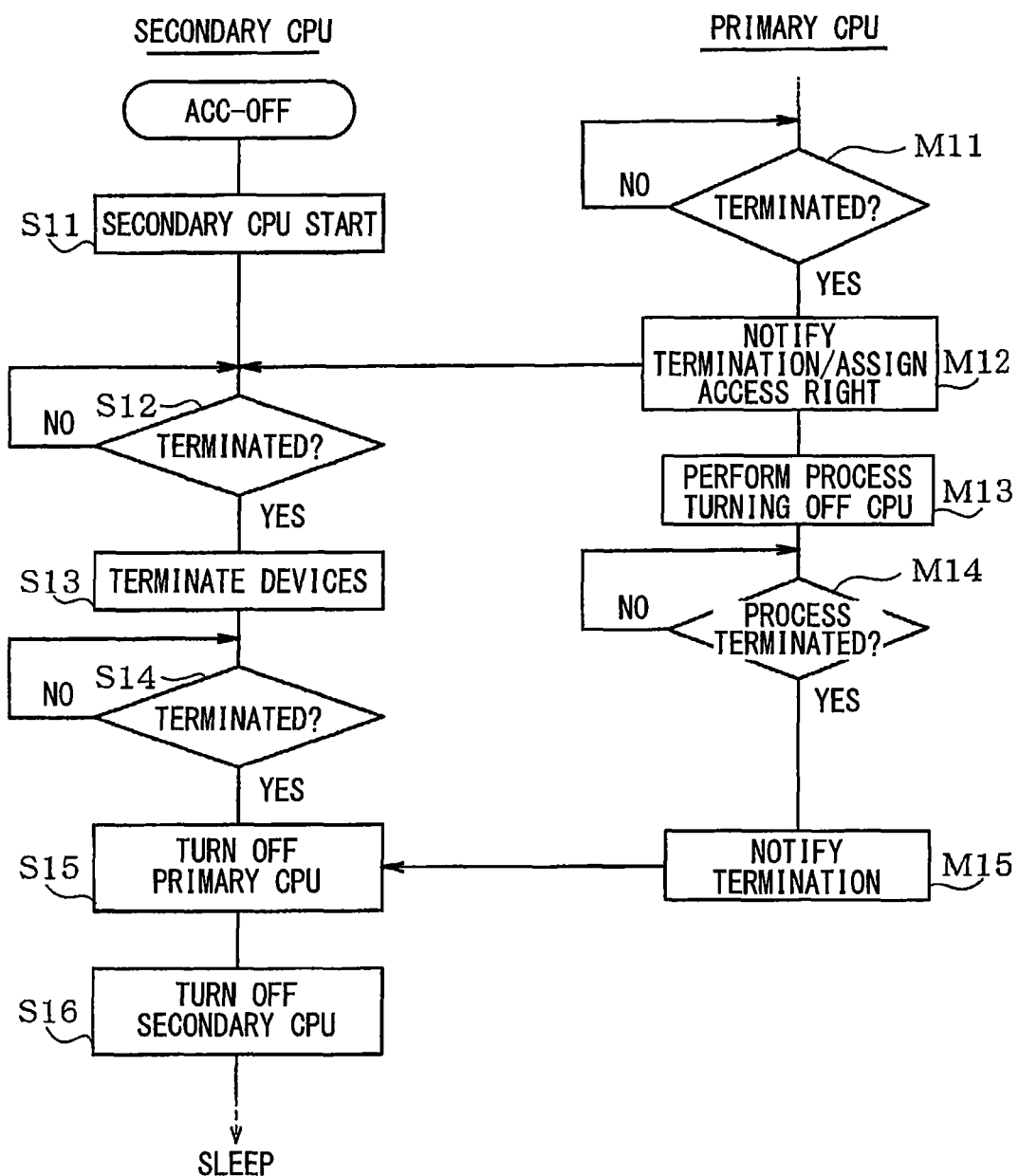
FIG. 4 is a flowchart illustrating processing steps that are performed by the control apparatus at system shutdown.

The flowchart of FIG. 4 illustrates processing steps that are performed by the secondary CPU 12 and the primary CPU 11 at system shutdown, that is, when the accessory switch is turned off. More specifically, when the accessory switch is turned off, the startup process is performed at S11 on the secondary CPU 12, which is in the standby state. Upon completion of the startup process, the secondary CPU 12 begins to wait for a notification from the primary CPU 11 at S12.

The primary CPU 11 performs a termination process for terminating, for example, a control program for various devices (M11). Upon completion of the termination process (Yes at M11), the primary CPU 11 sends a termination notification to the secondary CPU 12, and assigns the access right for the devices 3, 4 to the secondary CPU 12 at M12. The process for assigning the access right from the primary CPU 11 to the secondary CPU 12, which is performed upon completion of the termination process, will be described later with reference to FIGS. 5A, 5B, 6A, and 6B.

At M13, the primary CPU 11 performs its termination process. It is determined at M14 whether the termination process is terminated. If it is terminated (Yes at M14), the primary CPU 11 notifies the secondary CPU 12 that the primary CPU 11 is terminated at M15. This concludes the process that is performed by the primary CPU 11 when the accessory switch is turned off, and allows the secondary CPU 12 to turn off the primary CPU 11 (later-described S15).

Meanwhile, when the termination notification is received from the primary CPU 11 and the access right is assigned from the primary CPU 11 (M12), the secondary CPU 12 terminates its wait for the termination of the primary CPU 11 (Yes at S12), proceeds to S13, and performs a termination process on each device 3, 4 (reset, power off, etc.). At S14, the secondary CPU 12 begins to wait for a termination notification from the primary CPU 11. Upon receipt of the termination notification from the primary CPU 11 at M15 (Yes at S14), the secondary CPU 12 turns off the primary CPU 11, and performs its own termination process at S16. The secondary CPU 12 goes into the standby state (sleep state).

Even at system shutdown, the primary CPU 11 assigns control of the peripheral devices 3, 4 to the secondary CPU 12 and allows the secondary CPU 12 to perform the termination process on the peripheral devices 3, 4. The termination process can be efficiently performed on the primary CPU 11, the peripheral devices 3, 4, and the secondary CPU 12 and completed in a short period of time. Further, as the peripheral devices 3, 4 can be monitored with the secondary CPU 12 placed in the standby state, the startup process for next startup can be performed in a short period of time.

A procedure for switching (assigning) control of the video IF 3, which is one of the peripheral devices, between the primary CPU 11 and the secondary CPU 12 will now be described with reference to FIGS. 5A and 5B. FIG. 5A illustrates operating steps performed at system startup. FIG. 5B illustrates operating steps performed at system shutdown. As described, the communication between the video IF 3, the primary CPU 11, and the secondary CPU 11 is established in compliance with the I2C standard. The first selector 15 disposed between them performs access right switching as it is subjected to switching control exercised by the switching signal from the secondary CPU 12.

At startup (when the accessory switch is turned on), as in FIG. 5A, the first selector 15 gives the access right to the secondary CPU 12 (operation (1)) and allows the secondary CPU 12 to perform the initialization process on the video IF 3 (operation (2)). At the end of the initialization of the video IF 3, the switching signal from the secondary CPU 12 causes the first selector 15 to assign the access right to the primary CPU 11 (operation (3)), and the secondary CPU 12 establishes inter-CPU communication to notify that the access right is assigned to the primary CPU 11 (operation (4)). The primary CPU 11 performs, for example, video format setup for the video IF 3 (operation (5)) and begins to input and output video signals (operation (6)).

Operations performed at shutdown (when the accessory switch is turned off) are described below. Upon detecting that the accessory switch is off (operation (1)), the secondary CPU 12 establishes inter-CPU communication as in FIG. 5B to notify the primary CPU 11 that the accessory switch is turned off (operation (2)). The primary CPU 11 then performs the termination process (blackening the screen of the display apparatus 6) on the device 3 (video IF 3) (operation (3)), and establishes inter-CPU communication to notify the secondary CPU 12 of the completion of the termination process (operation (4)). The switching signal from the secondary CPU 12 causes the first selector 15 to assign the access right to the secondary CPU 12 (operation (5)), allowing the secondary CPU 12 to perform a reset process on the video IF 3 (operation (6)).

Figure 6A:
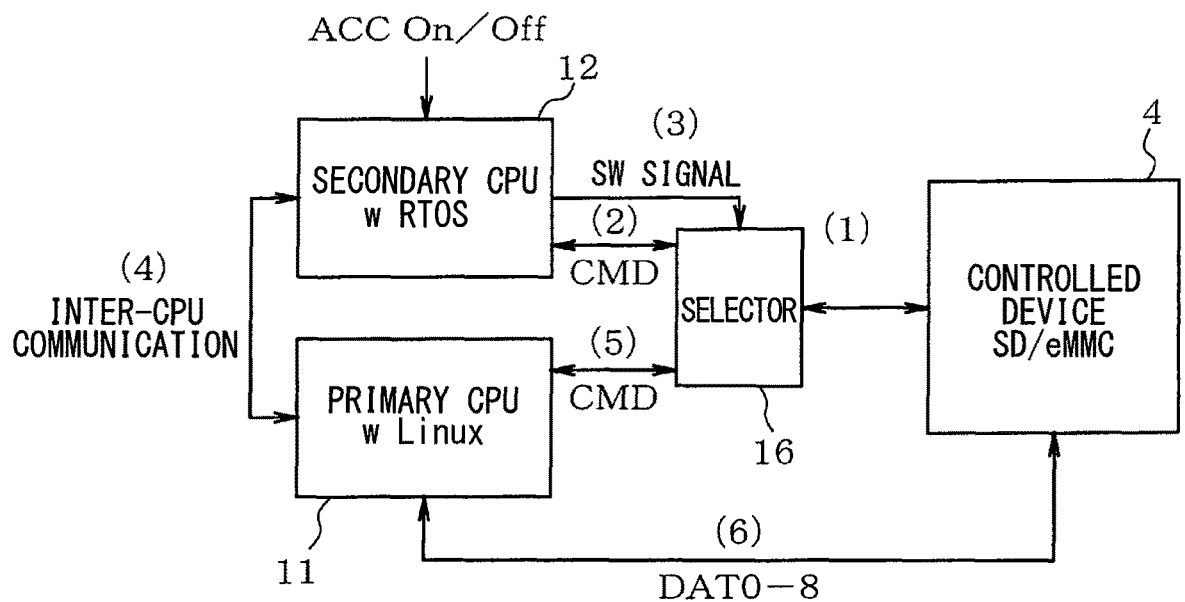
FIG. 6A is a diagram illustrating operating steps performed at startup and an essential configuration for CPU control switching with respect to a media device.
Figure 6B:
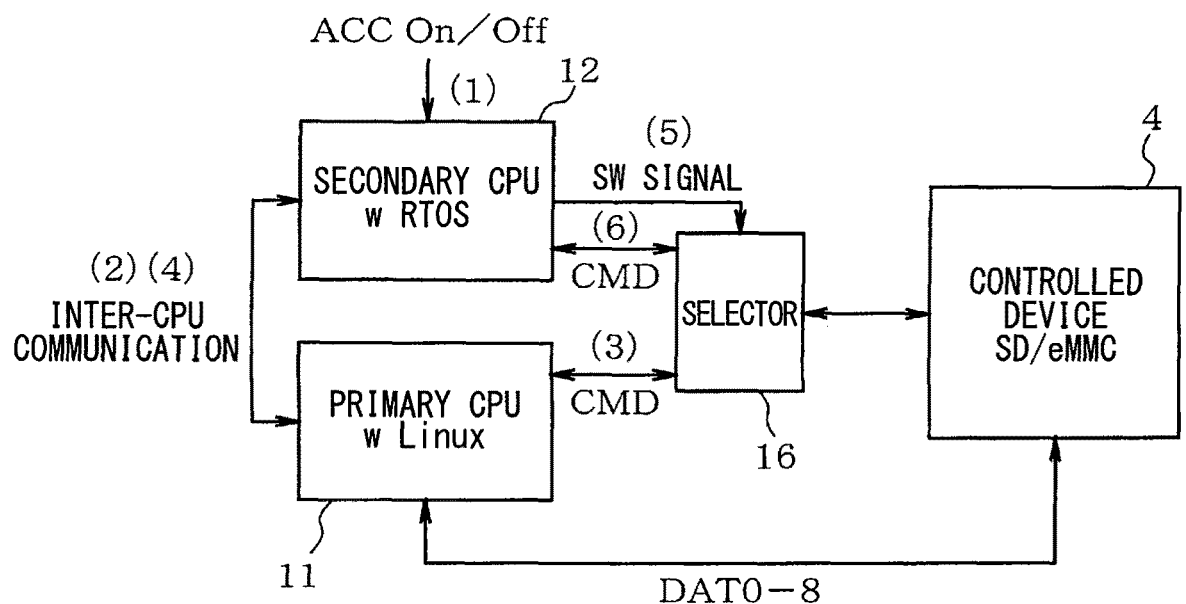
FIG. 6B is a diagram illustrating operating steps performed at shutdown and an essential configuration for CPU control switching with respect to the media device.

FIGS. 6A and 6B illustrate a procedure for switching (assigning) control of the media device 4, which is one of the peripheral devices, between the primary CPU 11 and the secondary CPU 12. FIG. 6A illustrates operating steps performed at system startup. FIG. 6B illustrates operating steps performed at system shutdown. As described, the communication between the media device 4, the primary CPU 11, and the secondary CPU 11 is established in compliance with the CMD standard. The second selector 16 disposed between them performs access right switching as it is subjected to switching control exercised by the switching signal from the secondary CPU 12.

At startup (when the accessory switch is turned on), as in FIG. 6A, the second selector 16 gives the access right to the secondary CPU 12 (operation (1)) and allows the secondary CPU 12 to perform the initialization process on the media device 4 (operation (2)). At the end of the initialization of the media device 4, the switching signal from the secondary CPU 12 causes the second selector 16 to assign the access right to the primary CPU 11 (operation (3)), and the secondary CPU 12 establishes inter-CPU communication to notify that the access right is assigned to the primary CPU 11 (operation (4)). The primary CPU 11 executes a read/write command on the media device 4 (operation (5)), causing the media device 4 to assign data to the primary CPU 11 (operation (6)).

Upon detecting that the accessory switch is off (operation (1)), the secondary CPU 12 establishes inter-CPU communication as in FIG. 6B to notify the primary CPU 11 that the accessory switch is turned off (operation (2)). The primary CPU 11 then performs the termination process (e.g., outputting a CMD 0 signal) on the media device 4 (operation (3)), and establishes inter-CPU communication to notify the secondary CPU 12 of the completion of the termination process (operation (4)). The switching signal from the secondary CPU 12 causes the second selector 16 to assign the access right to the secondary CPU 12 (operation (5)), allowing the secondary CPU 12 to perform a power-off or standby process on the media device 4 (operation (6)).

The in-vehicle system 1 according to the present embodiment is configured so that the primary CPU 11 operating on the Linux OS controls the peripheral devices, namely, the video IF 3 and the media device 4, during a regular operation, and that the secondary CPU 12 operating on the real-time OS performs the initialization process on the video IF 3 and the media device 4 at system startup. Optimum control can be exercised by selectively among the CPU 11 and the CPU 12 using one CPU for peripheral device control at system startup and another CPU for peripheral device control during a regular operation. Thus, optimum control can be exercised.

Consequently, the present embodiment provides an excellent advantageous effect of expediting the startup process of the system and reducing the time required for the completion of the startup process. For example, in the past, the time required for displaying a camera image on the display apparatus 6 when the accessory switch was turned on to exercise the function of the reverse guide camera was 3.4 seconds. Thus, the user was forced to wait for a long time. However, the present embodiment reduces such a wait time to 2 seconds or less. This is beneficial in terms of providing enhanced safety.

Further, in the present embodiment, the selectors 15, 16 are provided to switch the access right for the peripheral devices 3, 4 between the primary CPU 11 and the secondary CPU 12, and are subjected to switching control of the selectors 15, 16 exercised by the switching signal from the secondary CPU 12. Therefore, control assignment can be achieved with ease.

Furthermore, control of the peripheral devices 3, 4 is assigned from the primary CPU 11 to the secondary CPU 12 even at shutdown in order to let the secondary CPU 11 perform the termination process on the peripheral devices 3, 4 and go into the standby state. The shutdown process can be efficiently performed at system shutdown. Moreover, even when the accessory switch is off, the secondary CPU 12 is placed in the standby state and able to monitor the peripheral devices 3, 4. Additionally, at startup, the peripheral devices 3, 4 can be immediately started.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The foregoing embodiment has been described on the assumption that Linux is used as the general-purpose OS on which the primary CPU operates. However, the present disclosure is not limited to the use of such a general-purpose OS. Windows (registered trademark) and various other general-purpose OSes may also be used. Further, for example, the communication methods and data transmission standards enumerated so far are merely illustrative and not restrictive. Various other technologies can also be adopted. Furthermore, the foregoing embodiment has been described on the assumption that the video IF 3 and the media device 4 are used as the peripheral devices. However, the present disclosure is applicable to all devices amounted in a vehicle. Various changes can also be made to the overall hardware configuration of the in-vehicle system and to the software or hardware configuration of the control apparatus.

What is claimed is:
1. An in-vehicle system comprising:
 a primary CPU that is mounted in a vehicle and operates on a general-purpose OS; and
 a peripheral device that is controlled by the primary CPU, the in-vehicle system further comprising:
 a secondary CPU that operates on a real-time OS; and
 a selector provided in the peripheral device, the selector being configured to switch an access right for the peripheral device between the primary CPU and the secondary CPU,
 wherein at a startup when an accessary switch in the vehicle is turned on, the access right for the peripheral device is maintained as being assigned to the secondary CPU,
 wherein, in response to the startup when the accessory switch is turned on, the secondary CPU
  performs an initialization process on the peripheral device in parallel with the primary CPU performing power supply stabilization and program booting, and then outputs a first switching signal to the selector to cause the selector to switch the access right for the peripheral device from the secondary CPU to the primary CPU, wherein, in response to a shutdown when the accessory switch is turned off, the secondary CPU outputs a second switching signal to the selector to cause the selector to switch the access right for the peripheral device from the primary CPU to the secondary CPU, in order to let the secondary CPU perform a termination process on the peripheral device and go into a standby state.

2. The in-vehicle system according to claim 1, wherein the peripheral device includes a video interface that displays an image on a display apparatus.

3. The in-vehicle system according to claim 1, wherein the peripheral device includes a media device that stores an application program of the primary CPU.

* * * * *